US012772249B2

(12) United States Patent
Li et al.

(10) Patent No.: US 12,772,249 B2
(45) Date of Patent: Oct. 20, 2026

(54) INFORMATION TRANSMISSION METHOD AND APPARATUS, TERMINAL, AND STORAGE MEDIUM

(71) Applicant: VIVO MOBILE COMMUNICATION CO., LTD., Guangdong (CN)

(72) Inventors: Na Li, Guangdong (CN); Xin Qu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 378 days.

(21) Appl. No.: 18/507,545

(22) Filed: Nov. 13, 2023

(65) Prior Publication Data

US 2024/0080847 A1 Mar. 7, 2024

Related U.S. Application Data

(63) Continuation of application No. PCT/CN2022/091466, filed on May 7, 2022.

(30) Foreign Application Priority Data

May 11, 2021 (CN) ......................... 202110511261.X

(51) Int. Cl.
*H04W 72/21* (2023.01)
*H04L 5/00* (2006.01)

(52) U.S. Cl.
CPC ........... *H04W 72/21* (2023.01); *H04L 5/0055* (2013.01)

(58) Field of Classification Search
None
See application file for complete search history.

(56) References Cited

U.S. PATENT DOCUMENTS

2009/0109917 A1 4/2009 Pajukoski et al.
2019/0246416 A1 8/2019 Park et al.
2020/0314900 A1 10/2020 Hosseini et al.
(Continued)

FOREIGN PATENT DOCUMENTS

CN 109995481 A 7/2019
CN 110945826 A 3/2020
(Continued)

OTHER PUBLICATIONS

First Office Action for Chinese Application No. 202110511261.X, dated Jul. 28, 2023, 12 Pages.
(Continued)

*Primary Examiner* — Marcus Smith
*Assistant Examiner* — Francesca Lima Santos
(74) *Attorney, Agent, or Firm* — BROOKS KUSHMAN P.C.

(57) ABSTRACT

An information transmission method and apparatus, a terminal, and a storage medium, and pertains. The information transmission method in embodiments of this application includes: performing, by the terminal, conflict handling in a case that there is a conflict between feedback resources and transmission resources for a first uplink transmission, where the feedback resources are PUCCH resources, the feedback mode is NACK-only feedback mode, and the conflict handling includes one of the following: transmitting PUCCH or the first uplink transmission; and multiplexing PUCCH with the first uplink transmission for transmission.

11 Claims, 4 Drawing Sheets

(56) References Cited

U.S. PATENT DOCUMENTS

| | | | |
|---|---|---|---|
| 2020/0367265 A1 | 11/2020 | Wang et al. | |
| 2021/0099269 A1 | 4/2021 | Wu et al. | |
| 2021/0105126 A1* | 4/2021 | Yi | H04W 76/27 |
| 2021/0136781 A1* | 5/2021 | Hosseini | H04L 1/1854 |
| 2022/0132496 A1 | 4/2022 | Lu et al. | |
| 2022/0150912 A1 | 5/2022 | Li et al. | |
| 2022/0224465 A1 | 7/2022 | Li et al. | |
| 2022/0272712 A1 | 8/2022 | Mu | |
| 2022/0287057 A1 | 9/2022 | Yamamoto et al. | |
| 2022/0368504 A1 | 11/2022 | Zhao | |
| 2024/0056231 A1* | 2/2024 | Yin | H04L 1/1854 |

FOREIGN PATENT DOCUMENTS

| | | |
|---|---|---|
| CN | 111601339 A | 8/2020 |
| CN | 111601388 A | 8/2020 |
| CN | 111800880 A | 10/2020 |
| CN | 111835480 A | 10/2020 |
| CN | 112311508 A | 2/2021 |
| JP | 2011502415 A | 1/2011 |
| JP | 2020504955 A | 2/2020 |
| JP | 2023501411 A | 1/2023 |
| WO | 2020134382 A1 | 7/2020 |
| WO | 2020205129 A1 | 10/2020 |
| WO | 2020220230 A1 | 11/2020 |
| WO | 2021007783 A1 | 1/2021 |
| WO | 2021009967 A1 | 1/2021 |
| WO | 2021026836 A1 | 2/2021 |
| WO | 2021088009 A1 | 5/2021 |

OTHER PUBLICATIONS

International Search Report and Written Opinion for Application No. PCT /CN2022/091466, dated Aug. 3, 2022, 7 Pages.

Extended European Search Report for Application No. 22806652.8, dated Oct. 8, 2024, 11 Pages.

Universite Europeenne de Bretagne, “Analysis and Optimization of Hybrid Single Packet and Multiple-Packet Incremental Redundancy in the presence of Channel State Information” Moustapha El Aoun et al., France, Jan. 2021, 5 Pages.

Moderator (Huawei) “FL summary#2 on improving reliability for MBS for RRC_Connected UEs” 3GPP TSG RAN WGJ Meeting #104-e, E-meeting, Jan. 2021, R1-2101906, 68 Pages.

Sony “Consideration on intra-UE UL multiplexing” 3GPP TSG WG1 #104bis-e, e-Meeting, Apr. 2021, R1-2103303, 8 Pages.

First Office Action for Japanese Application No. 2023-568710, dated Sep. 26, 2024, 17 Pages.

Nokia, Nokia Shanghai Bell “On UL intra-UE multiplexing and prioritization enhancements” 3GPP TSG RAN WG1 #104-e, e-Meeting, Jan. 2021, R1-2100729, 21 Pages.

Oppo “UL feedback for RRC-Connected UEs in MBS”3GPP TSG RAN WG1 #104b-e, e-Meeting, Apr. 2021, R1-2102415, 6 Pages.

* cited by examiner

INFORMATION TRANSMISSION METHOD AND APPARATUS, TERMINAL, AND STORAGE MEDIUM

CROSS-REFERENCE TO RELATED APPLICATIONS

This application is a continuation of PCT International Application No. PCT/CN2022/091466 filed on May 7, 2022, which claims priority to Chinese Patent Application No. 202110511261.X filed on May 11, 2021, which are incorporated herein by reference in their entireties.

TECHNICAL FIELD

This application relates to the field of communication technology, and specifically to an information transmission method and apparatus, a terminal, and a storage medium.

BACKGROUND

In some communication systems, terminals provide feedback to network-side devices regarding downlink transmissions. Specifically, the terminal may provide feedback on decoding results for the downlink transmission to inform the network-side device of whether the downlink transmission has been successfully decoded. Currently, the feedback mode used by terminals is mainly the hybrid automatic repeat request acknowledgement/negative-acknowledgment (HARQ-ACK/NACK) feedback mode, where an ACK is provided if the decoding is successful and otherwise a NACK is provided. In addition, the existing solution used by terminals for resolving conflict between feedback resources and uplink transmission resources are only applicable to the HARQ-ACK/NACK feedback mode, resulting in poor conflict resolution performance for terminals.

SUMMARY

According to a first aspect, an information transmission method is provided, including:

performing, by a terminal, conflict handling in a case that there is a conflict between feedback resources and transmission resources for a first uplink transmission, where the feedback resources are physical uplink control channel (PUCCH) resources, the feedback mode is negative-acknowledgment NACK-only (NACK) feedback mode, and the conflict handling includes one of the following:

transmitting PUCCH or the first uplink transmission; and multiplexing PUCCH with the first uplink transmission for transmission.

According to a second aspect, an information transmission apparatus is provided, including:

a performing module configured to perform conflict handling in a case that there is a conflict between feedback resources and transmission resources for a first uplink transmission, where the feedback resources are PUCCH resources, the feedback mode is negative-acknowledgment NACK-only feedback mode, and the conflict handling includes one of the following:

transmitting PUCCH or the first uplink transmission; and multiplexing PUCCH with the first uplink transmission for transmission.

According to a third aspect, a terminal is provided, including a processor, a memory, and a program or instructions stored in the memory and capable of running on the processor, where when the program or instructions are executed by the processor, the steps of the information transmission method provided in the embodiments of this application are implemented.

According to a fourth aspect, a readable storage medium is provided, where the readable storage medium stores a program or instructions. When the program or instructions are executed by a processor, the steps of the information transmission method provided in the embodiments of this application are implemented.

According to a fifth aspect, a chip is provided, where the chip includes a processor and a communication interface, the communication interface is coupled to the processor, and the processor is configured to run a program or instructions to implement the steps of the method according to the first aspect.

According to a sixth aspect, a computer program/program product is provided. The computer program/program product is stored in a non-transient storage medium, and the program/program product is executed by at least one processor to implement steps of the method according to the first aspect.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that terminologies used in this way is interchangeable in appropriate circumstances such that the embodiments of this application can be implemented in other orders than the order illustrated or described herein. In addition, objects distinguished by "first" and "second" are generally of a same type, and the quantities of the objects are not limited. For example, there may be one or more first objects. In addition, "and/or" in the specification and claims represents at least one of connected objects, and the character "/" generally indicates that the contextually associated objects have an "or" relationship.

It should be noted that the technology described in embodiments of this application is not limited to a long term evolution (LTE)/LTE-advanced (LTE-A) system, and may also be used in various wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably. The described technology may be used in the foregoing system and radio technology, or may be used in another system and radio technology. In the following descriptions, a new radio (NR) system is described for an illustration purpose, and NR terms are used in most of the following descriptions, although these technologies may also be applied to other applications than the NR system application, for example, to the $6^{th}$ generation (6G) communication system.

Figure 1:
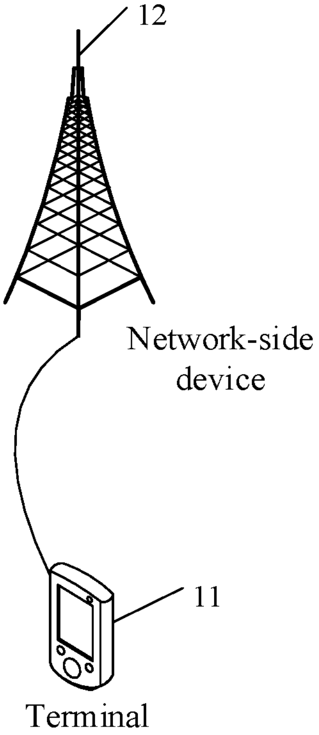
FIG. 1 shows a block diagram of a wireless communication system applicable to an embodiment of this application.

FIG. 1 shows a block diagram of a wireless communication system applicable to an embodiment of this application. The wireless communication system includes a terminal 11 and a network-side device 12. The terminal 11 may also be referred to as a terminal device or user equipment (UE). The terminal 11 may be a terminal-side device, such as a mobile phone, a tablet computer, a laptop computer or notebook computer, a personal digital assistant (PDA), a palmtop computer, a netbook, an ultra-mobile personal computer (UMPC), a mobile internet device (MID), a wearable device, vehicular user equipment (VUE), or pedestrian user equipment (PUE). The wearable device includes a smart watch, a wrist band, earphones, glasses, and the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, a transmission reception point (TRP), or other appropriate terms in the art. Provided that the same technical effects are achieved, the base station is not limited to any specific technical term. It should be noted that in the embodiments of this application, only the base station in the NR system is used as an example, although the specific type of the base station is not limited.

The following describes in detail the information transmission method and apparatus, the terminal, and the storage medium provided in the embodiments of this application through some embodiments and application scenarios thereof, with reference to the accompanying drawings.

Figure 2:
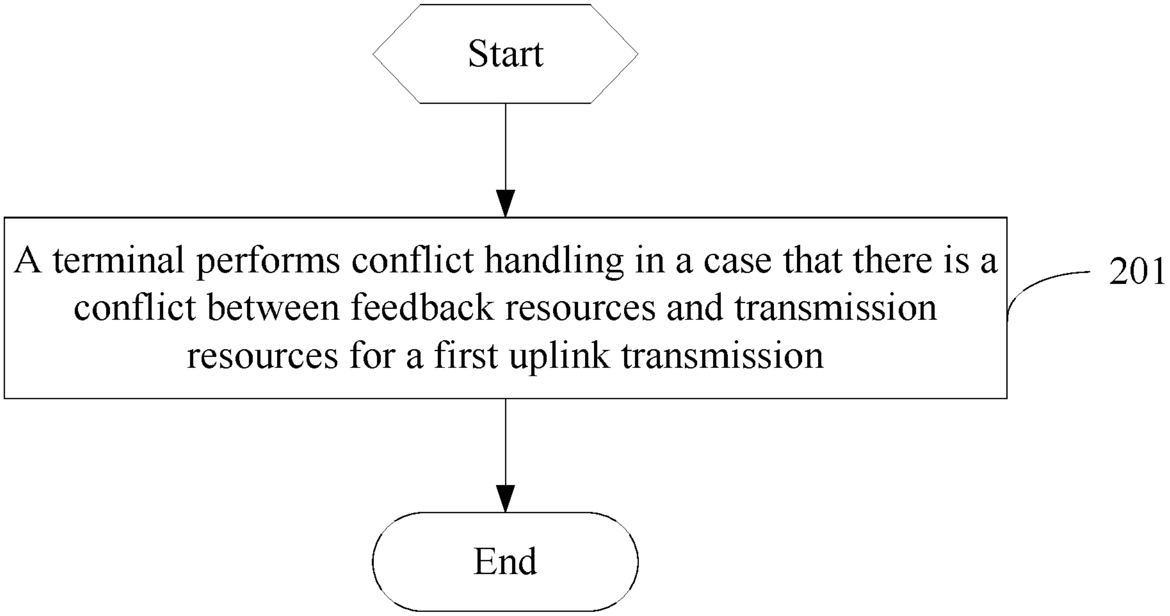
FIG. 2 is a flowchart of an information transmission method according to an embodiment of this application.

FIG. 2 is a flowchart of an information transmission method according to an embodiment of this application. As shown in FIG. 2, the method includes the following steps:

Step 201. The terminal performs conflict handling in a case that there is a conflict between feedback resources and transmission resources for a first uplink transmission, where the feedback resources are PUCCH resources, the feedback mode is NACK-only feedback mode, and the conflict handling includes one of the following:

transmitting PUCCH or the first uplink transmission; and multiplexing PUCCH with the first uplink transmission for transmission.

The foregoing feedback resources are the transmission resources for PUCCH. In some embodiments, the foregoing PUCCH can be PUCCH for transmitting NACK, such as in the NACK-only feedback mode, the PUCCH for transmitting NACK when it is determined that the downlink transmission has not been successfully decoded.

The conflict between the feedback resources and the transmission resources for the first uplink transmission may be that the feedback resources and the transmission resources for the first uplink transmission overlap in time domain, that is, the PUCCH and the transmission resources for the first uplink transmission overlap in time domain. In addition, the overlap can be full overlap or partial overlap, and the feedback resources and the transmission of the first uplink transmission are within the same PUCCH group. The foregoing conflict handling can also be referred to as overlap handling.

In addition, the foregoing NACK-only feedback mode may be a NACK-only feedback mode for downlink transmission, such as a NACK-only feedback mode for physical downlink shared channel (PDSCH) or physical downlink control channel (PDCCH), that is, a HARQ feedback mode in which the terminal provides NACK feedback only in the case that the PDSCH/PDCCH has not been successfully decoded, and provides no information feedback in the case that the PDSCH/PDCCH has been successfully decoded. Such PDCCH is a protocol-defined PDCCH that needs feedback, for example, a PDCCH that indicates release of semi-persistent scheduling (SPS) PDSCH.

In the NACK-only feedback mode, the terminal provides NACK feedback in the case that the PDSCH/PDCCH has not been successfully decoded, and no feedback is provided otherwise. The PDSCH/PDCCH having not been successfully decoded includes a case that no PDSCH/PDCCH is received.

The "transmitting PUCCH or the first uplink transmission" may be transmitting the PUCCH and dropping or canceling the first uplink transmission, or may be transmitting the first uplink transmission and dropping or canceling the PUCCH. It should be noted that in the embodiments of this application, both "dropping" and "canceling" can be understood as not transmitting, and these terms can be used interchangeably. Dropping or canceling content carried on the PUCCH can also indicate dropping or canceling the transmission of the PUCCH.

The "multiplexing PUCCH with the first uplink transmission for transmission" can be multiplexing information carried on the PUCCH with the first uplink transmission for transmission, such as multiplexing HARQ information with the first uplink transmission for transmission.

In this embodiment of this application, the first uplink transmission includes at least one of the following:

channel state information (CSI), physical uplink shared channel (PUSCH), and scheduling request (SR).

The CSI and SR are respectively transmitted on PUCCHs, that is, the first uplink transmission can include CSI PUCCH and SR PUCCH.

In this embodiment of this application, the foregoing steps can resolve conflicts in the NACK-only feedback mode, thereby improving conflict resolution performance of the terminal. Furthermore, since the foregoing conflicts have resolved, effectiveness of the communication system can be further enhanced.

In an optional embodiment, the PUCCH can be a NACK PUCCH, and the transmitting the PUCCH or the first uplink transmission includes one of the following:

transmitting the NACK PUCCH and dropping or canceling the first uplink transmission; and transmitting the first uplink transmission and dropping or canceling the NACK PUCCH.

The foregoing NACK PUCCH can be understood as PUCCH for transmitting NACK, for example, a PUCCH determined by the terminal for transmitting a NACK when the terminal has not successfully decoded the PDSCH.

In this embodiment of this application, the dropping or canceling the NACK PUCCH can alternatively be understood as dropping or canceling the NACK.

The transmitting the NACK PUCCH and dropping or canceling the first uplink transmission or the transmitting the first uplink transmission and dropping or canceling the NACK PUCCH may specifically be performing transmission according to network-side configuration or protocol specification.

For example, in a case that there is a time-domain resource conflict between the NACK PUCCH and the SR PUCCH, the terminal drops or cancels the SR and transmits the NACK PUCCH, where the NACK PUCCH is a PUCCH determined by the terminal for transmitting NACK when the terminal has not successfully decoded the PDSCH in the NACK-only feedback mode.

For another example, in a case that there is a time-domain resource conflict between the NACK PUCCH and the CSI PUCCH, the terminal can transmit the NACK PUCCH and drop or cancel the CSI, or drop or cancel the NACK and transmit the CSI, where the NACK PUCCH is a PUCCH determined by the terminal for transmitting NACK when the terminal has not successfully decoded the PDSCH in the NACK-only feedback mode.

For another example, in a case that there is a time-domain resource conflict between the NACK PUCCH and the PUSCH, the terminal can transmit the NACK PUCCH and drop or cancel the PUSCH, or drop or cancel the NACK and transmit the PUSCH, where the NACK PUCCH is a PUCCH determined by the terminal for transmitting NACK when the terminal has not successfully decoded the PDSCH in the NACK-only feedback mode.

In an optional embodiment, the PUCCH can be a NACK PUCCH, and the transmitting the PUCCH or the first uplink transmission includes one of the following:

- transmitting one of the NACK PUCCH and the first uplink transmission and dropping or canceling the other based on a priority of the NACK PUCCH and a priority of the first uplink transmission;
- transmitting one of the NACK PUCCH and the first uplink transmission and dropping or canceling the other based on a type of the first uplink transmission; and
- transmitting one of the NACK PUCCH and the first uplink transmission and dropping or canceling the other based on at least one of network-side indication signaling and reference signal received power (RSRP).

The transmitting one of the NACK PUCCH and the first uplink transmission and dropping or canceling the other based on a priority of the NACK PUCCH and a priority of the first uplink transmission can be transmitting the higher-priority one between the NACK PUCCH and the first uplink transmission, and dropping or canceling the other.

For example, the transmitting one of the NACK PUCCH and the first uplink transmission and dropping or canceling the other based on a priority of the NACK PUCCH and a priority of the first uplink transmission includes at least one of the following:

- in a case that the priority of the first uplink transmission is higher than or equal to the priority of the NACK PUCCH, transmitting the first uplink transmission and dropping or canceling the NACK PUCCH; and
- in a case that the priority of the first uplink transmission is lower than or equal to the priority of the NACK PUCCH, transmitting the NACK PUCCH and dropping or canceling the first uplink transmission.

For example, if the priority of NACK is higher than or equal to the priority of CSI, the terminal transmits the NACK PUCCH and drops or cancels the CSI; otherwise, the terminal drops or cancels the NACK and transmits the CSI.

In this embodiment of this application, transmitting CSI can also be referred to as transmitting CSI PUCCH.

For example, if the priority of NACK is higher than or equal to the priority of PUSCH, the terminal transmits the NACK PUCCH and drops or cancels the PUSCH; otherwise, the terminal drops or cancels the NACK and transmits the PUSCH.

In some embodiments, in a case that the first uplink transmission includes an SR, the transmitting one of the NACK PUCCH and the first uplink transmission and dropping or canceling the other based on a priority of the NACK PUCCH and a priority of the first uplink transmission includes at least one of the following:

- in a case that the priority of the SR is higher than or equal to the priority of the NACK PUCCH and the SR is a positive SR, transmitting the SR and dropping or canceling the NACK PUCCH;
- in a case that the priority of the SR is higher than or equal to the priority of the NACK PUCCH and the SR is a negative SR, transmitting the NACK PUCCH and dropping or canceling the SR; and
- in a case that the priority of the SR is lower than or equal to the priority of the NACK PUCCH, transmitting the NACK PUCCH and dropping or canceling the SR.

In this embodiment of this application, transmitting SR can also be referred to as transmitting SR PUCCH.

In this implementation, SR can be transmitted only in a case that the SR is a positive SR and its priority is higher than the priority of NACK PUCCH; otherwise, NACK PUCCH is transmitted. In other words, once the SR is a negative SR, NACK PUCCH is transmitted immediately without considering the priority, and the SR is dropped or canceled (that is, the SR is not transmitted).

In this implementation, the transmission of higher-priority positive SR is ensured, while in the case of negative SR, NACK PUCCH is transmitted in priority, thereby improving transmission performance of the terminal. For example, if the priority of SR is equal to or higher than the priority of NACK, in the case that SR is a positive SR, SR is transmitted and NACK is dropped or canceled; and in a case that SR is a negative SR, NACK PUCCH is transmitted, and SR is dropped or canceled. If the priority of SR is lower than the priority of NACK, NACK PUCCH is transmitted and SR is dropped, even if SR is a positive SR.

In this embodiment of this application, the type of the foregoing first uplink transmission can include positive or negative.

In some embodiments, in a case that the first uplink transmission includes an SR, the transmitting one of the NACK PUCCH and the first uplink transmission and dropping or canceling the other based on a type of the first uplink transmission includes at least one of the following:

- in a case that the SR is a positive SR, transmitting the SR and dropping or canceling the NACK PUCCH; and
- in a case that the SR is a negative SR, transmitting the NACK PUCCH and dropping or canceling the SR.

In this implementation, positive SR is transmitted in priority, while in the case of negative SR, NACK PUCCH is transmitted in priority, thereby improving transmission performance of the terminal. For example, if SR is a positive SR, NACK is dropped and SR is transmitted. If SR is a negative SR, NACK is transmitted.

In this embodiment of this application, the network-side indication signaling can be DCI indication or higher-layer signaling. This signaling can configure that the NACK PUCCH is to be transmitted and the first uplink transmission is to be dropped or canceled, or configure that the first uplink transmission is to be transmitted and the NACK PUCCH is to be dropped or canceled, or configure that the terminal is to perform transmission based on RSRP.

In some embodiments, the terminal can alternatively directly perform transmission based on RSRP. For example, the transmitting one of the NACK PUCCH and the first uplink transmission and dropping or canceling the other based on at least one of network-side indication signaling and RSRP includes at least one of the following:

in a case that the RSRP is greater than or equal to a preset threshold, transmitting the first uplink transmission and dropping the NACK PUCCH; and in a case that the RSRP is less than the preset threshold, transmitting the NACK PUCCH and canceling the first uplink transmission.

The preset threshold can be defined by a protocol or configured by the network-side device.

In this implementation, because the reception failure probability of the terminal is relatively low in a case that the RSRP is greater than or equal to the preset threshold, the first uplink transmission is transmitted; because the reception failure probability is relatively high in a case that the RSRP is less than the preset threshold, the NACK PUCCH is transmitted, so as to improve the transmission performance of the terminal. Optionally, in this embodiment, such method can be applied in scenarios where the priority of NACK PUCCH is the same as the priority of the first uplink transmission.

For example, assuming that RSRP of a cell-edge UE is less than the threshold, indicating a higher probability of reception failure, such terminal sends a NACK to trigger the network-side device to perform retransmission. RSRP of a cell-center UE is greater than or equal to the threshold, SR, CSI, and PUSCH can be transmitted in priority, and NACK feedback is dropped or canceled.

In an optional embodiment, the multiplexing PUCCH with the first uplink transmission for transmission includes:

in a case that there is a conflict between the feedback resources and the transmission resources for the first uplink transmission in a target time unit, multiplexing N bits of HARQ information with the first uplink transmission for transmission, where the target time unit is a time unit configured or scheduled to report at least one piece of HARQ information, and N is an integer greater than or equal to 1.

N can be defined by a protocol or configured by the network-side device, such as 1 bit.

The HARQ information is the information transmitted by the PUCCH, such as NACK or ACK.

Optionally, in a case that downlink transmission corresponding to the HARQ information has been successfully decoded, the HARQ information is an ACK; or in a case that downlink transmission corresponding to the HARQ information has not been successfully decoded, the HARQ information is a NACK.

The target time unit can be one or more symbols, slots, subframes, or other time units.

The target time unit can be a time unit that is configured or scheduled by the network-side device to report at least one piece of HARQ information. In other words, the terminal needs to report at least one piece of HARQ information within the target time unit. The being configured or scheduled to report at least one piece of HARQ information can be reporting at least one NACK within that time unit if the downlink transmission decoding fails.

In this embodiment, N bits of HARQ information can be multiplexed with the first uplink transmission for transmission within the target time unit, thereby improving the transmission performance of the terminal.

It should be noted that the foregoing multiplexed transmission method can also be applied to HARQ-ACK/NACK feedback modes. In other words, the foregoing embodiment is not limited to NACK-only feedback mode. In other feedback modes, if there is a conflict between the feedback resources and the transmission resources for the first uplink transmission within the target time unit, N bits of HARQ information are multiplexed with the first uplink transmission for transmission. For example, in a case of a conflict between HARQ information and CSI/PUSCH, 1 bit of the HARQ information is always multiplexed onto CSI PUCCH/PUSCH.

For example, in a specific time unit, the terminal is configured or scheduled to: if at least one PDSCH has not been successfully decoded, report NACK for the at least one PDSCH. In this way, the terminal determines the PUCCH resources for NACK transmission based on NACK transmission (regardless of whether PDSCH has been decoded successfully or not). When these PUCCH resources conflict with CSI resources or PUSCH resources, the terminal always multiplexes 1 bit of HARQ information with CSI or PUSCH (or multiplexes 1 bit of HARQ information on CSI PUCCH or PUSCH). If PDSCH has not been decoded successfully, the 1-bit HARQ information is NACK; otherwise, the 1-bit HARQ information is ACK.

Optionally, the priority of the HARQ information is the same as the priority of the first uplink transmission.

In this implementation, in a case that the priority of the HARQ information is the same as the priority of the first uplink transmission, the HARQ information can be multiplexed with the first uplink transmission for transmission, so as to improve the transmission performance of the terminal.

In this embodiment of this application, in a case that there is a conflict between the feedback resources and the transmission resources for the first uplink transmission, the terminal performs conflict handling. The feedback resources are PUCCH resources, and the feedback mode is NACK-only feedback mode. The conflict handling includes one of the following: transmitting PUCCH or the first uplink transmission, or multiplexing PUCCH with the first uplink transmission for transmission. The foregoing conflict handling can resolve conflicts in the NACK feedback mode, improving the conflict resolution performance of the terminal.

The method provided in the embodiments of this application is illustrated through the following multiple embodiments:

Embodiment 1

For the NACK-only HARQ feedback mode, when the terminal receives PDSCH, it determines, based on a decoding result of PDSCH, whether to provide HARQ feedback. If the terminal has not successfully decoded PDSCH (including a case that the terminal receives no PDSCH/PDCCH), it provides NACK feedback; otherwise, the terminal provides no feedback.

Figure 3:
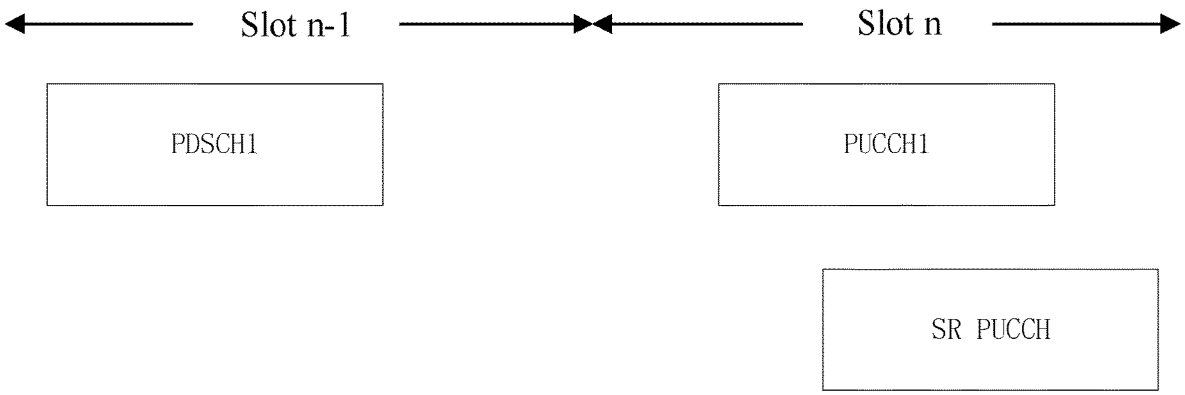
FIG. 3 is a schematic flowchart of a conflict according to an embodiment of this application.

As shown in FIG. 3, it is assumed that the network-side device schedules the terminal to provide NACK feedback (if it is a NACK) for PDSCH 1 in slot n, with the HARQ feedback timing indicator in the DCI set to 1. The PUCCH resources for NACK feedback can be configured by a higher layer or based on the DCI indication for scheduling PDSCH. If the terminal receives PDSCH 1 but has not successfully decoded PDSCH 1, and determines to transmit NACK on PUCCH 1, and there are also SR PUCCH resources in that time unit, as for SR, the terminal needs to transmit SR PUCCH when the SR is positive; and the terminal does not need to transmit SR PUCCH when the SR is negative. Assuming that PUCCH 1 and SR PUCCH resources overlap, the terminal can perform the following conflict handling:

Option 1: When SR is positive SR, transmitting SR PUCCH and dropping or canceling NACK; and when SR is negative SR, transmitting NACK PUCCH and dropping or canceling SR.

Option 2: Determining, based on priorities of SR and NACK, whether to transmit NACK or SR. In a case the priority of SR is higher than or equal to the priority of NACK, if SR is positive SR, the terminal transmits SR; and if SR is negative SR, the terminal transmits NACK PUCCH. If the priority of SR is lower than the priority of NACK, the terminal transmits NACK PUCCH, regardless of whether SR is positive SR or negative SR.

Option 3: Determine, based on at least one of the following, whether to drop NACK or SR:

DCI indication or higher-layer signaling configuration, and

RSRP.

For example, assuming that a cell-edge UE (with RSRP less than a specified threshold) has a higher probability of reception failure, a cell-center UE (with RSRP greater than or equal to the specified threshold) can perform other uplink transmissions in priority, such as SR, and drop NACK feedback. In this case, NACK is sent by the cell-edge UE to trigger the network-side device to perform retransmission.

In addition, Option 3 can be combined with priority, for example, it can be applied in scenarios where SR and NACK have the same priority.

Embodiment 2

Figure 4:
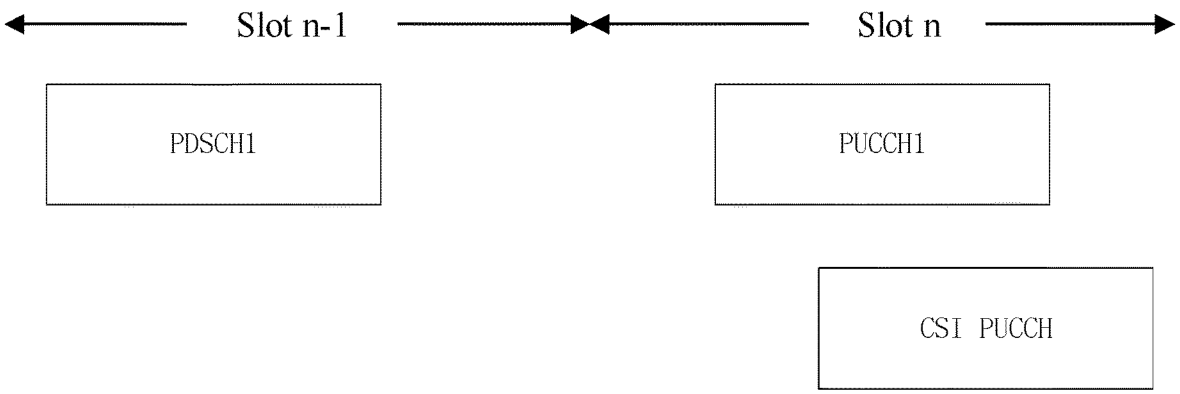
FIG. 4 is a schematic flowchart of another conflict according to an embodiment of this application.

As shown in FIG. 4, assuming that the network-side device schedules the terminal to provide NACK feedback (if it is NACK) for PDSCH 1 in time slot n, with the HARQ feedback timing indicator in the DCI set to 1. The PUCCH resources for NACK feedback can be configured by high-layer or based on the DCI indication for scheduling PDSCH. For PDSCH 1, if the terminal has not successfully decoded it, NACK is transmitted on PUCCH 1; otherwise, the terminal does not transmit HARQ PUCCH. At the same time, there are CSI PUCCH resources in the same time unit, and PUCCH 1 and CSI PUCCH have resources overlapped. For the conflict between NACK PUCCH resources and CSI PUCCH resources, the following conflict handling can be performed:

Option 1: In the NACK-only feedback mode, when the terminal has not successfully decoded PDSCH, it determines the PUCCH resources for NACK transmission (or if terminal has not successfully decoded PDSCH 1, NACK PUCCH needs to be transmitted). The terminal can perform the following:

Option 1-1: Transmit NACK PUCCH and drop CSI, or drop NACK and transmit CSI;

Option 1-2: Determine whether to transmit NACK or CSI based on the priority of NACK and CSI, and if the priority of NACK is higher than or equal to the priority of CSI, transmit NACK and drop CSI; otherwise, drop NACK and transmit CSI; or Option 1-3: Determine whether to drop NACK or SR based on at least one of the following:

DCI indication or higher-layer signaling configuration, and

RSRP.

For example, assuming that cell-edge UEs (with RSRP less than a specific threshold) have a higher probability of reception failure, cell-center UEs (with RSRP greater than or equal to a certain threshold) can transmit other CSI, drop NACK feedback, NACK sent by cell-edge UEs to trigger network-side device retransmission.

In addition, Option 1-3 can be combined with priority considerations, for example, Option 1-3 can be applied in scenarios where SR and NACK have the same priority.

Option 2: In a specific time unit, if the terminal indicates to feedback NACK for at least one PDSCH (if PDSCH has not been decoded successfully), the terminal determines the PUCCH resources for NACK transmission (determine the PUCCH resources for NACK transmission regardless of whether PDSCH has been decoded successfully or not). When these PUCCH resources conflict with CSI resources, the terminal always multiplexes 1 bit of HARQ information with CSI. If PDSCH has not been decoded successfully, the 1-bit HARQ information is NACK; otherwise, the 1-bit HARQ information is ACK.

Optionally, NACK and CSI have the same priority.

In Option 2, within the foregoing time unit, the terminal always multiplexes 1 bit of HARQ information with CSI. Optionally, it can be multiplexed with CSI resources for transmission. If PDSCH 1 is successfully decoded by the terminal, the 1-bit information is ACK; otherwise, the 1-bit information is NACK.

It should be noted that for the conflict between NACK PUCCH and PUSCH, it is similar to the conflict between NACK PUCCH and PUSCH, and will not be further described herein. It should be noted that NACK PUCCH and PUSCH can coexist in a same Cell or different Cells, as long as there is an overlap in time domain resources, it is considered a conflict.

Figure 5:
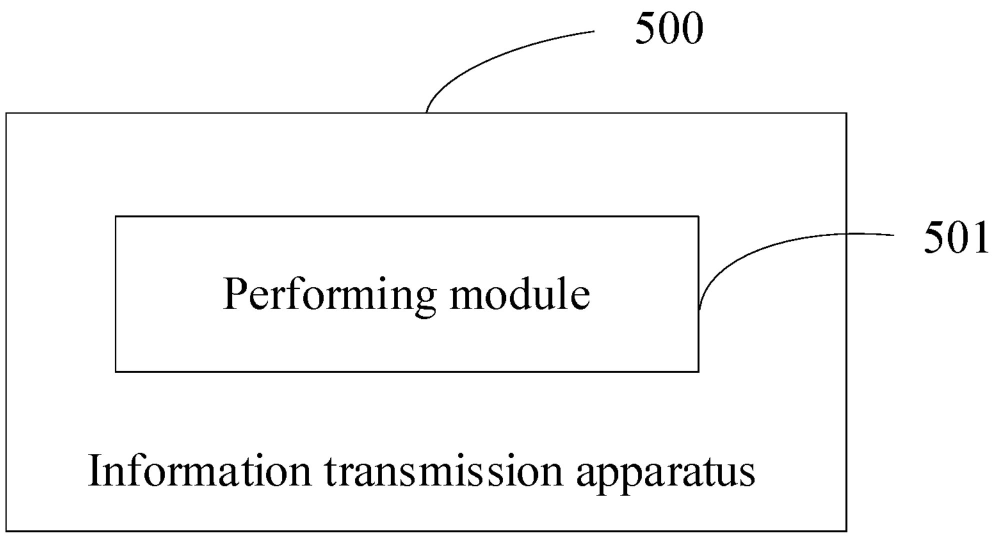
FIG. 5 is a structural diagram of an information transmission apparatus according to an embodiment of this application.

FIG. 5 is a structural diagram of an information transmission apparatus provided in the embodiments of this application. As shown in FIG. 5, the apparatus includes:

a performing module 501 configured to perform conflict handling in a case that there is a conflict between feedback resources and transmission resources for a first uplink transmission, where the feedback resources are physical uplink control channel PUCCH resources, the feedback mode is negative-acknowledgment NACK-only feedback mode, and the conflict handling includes one of the following:

transmitting PUCCH or the first uplink transmission; and multiplexing PUCCH with the first uplink transmission for transmission.

Optionally, the foregoing apparatus may further include a determination module used for determining whether the downlink transmission is successfully decoded.

Optionally, the PUCCH can be a NACK PUCCH, and "transmitting the PUCCH or the first uplink transmission" includes one of the following:

transmitting the NACK PUCCH and dropping or canceling the first uplink transmission; and transmitting the first uplink transmission and dropping or canceling the NACK PUCCH.

Optionally, the PUCCH can be a NACK PUCCH, and "transmitting the PUCCH or the first uplink transmission" includes one of the following:

transmitting one of the NACK PUCCH and the first uplink transmission and dropping or canceling the other based on a priority of the NACK PUCCH and a priority of the first uplink transmission;

transmitting one of the NACK PUCCH and the first uplink transmission and dropping or canceling the other based on a type of the first uplink transmission; and transmitting one of the NACK PUCCH and the first uplink transmission and dropping or canceling the other based on at least one of network-side indication signaling and reference signal received power RSRP.

Optionally, the transmitting one of the NACK PUCCH and the first uplink transmission and dropping or canceling the other based on a priority of the NACK PUCCH and a priority of the first uplink transmission includes at least one of the following:

in a case that the priority of the first uplink transmission is higher than or equal to the priority of the NACK PUCCH, transmitting the first uplink transmission and dropping or canceling the NACK PUCCH; and in a case that the priority of the first uplink transmission is lower than or equal to the priority of the NACK PUCCH, transmitting the NACK PUCCH and dropping or canceling the first uplink transmission.

Optionally, in a case that the first uplink transmission includes a scheduling request SR, the transmitting one of the NACK PUCCH and the first uplink transmission and dropping or canceling the other based on a priority of the NACK PUCCH and a priority of the first uplink transmission includes at least one of the following:

in a case that the priority of the SR is higher than or equal to the priority of the NACK PUCCH and the SR is a positive SR, transmitting the SR and dropping or canceling the NACK PUCCH;

in a case that the priority of the SR is higher than or equal to the priority of the NACK PUCCH and the SR is a negative SR, transmitting the NACK PUCCH and dropping or canceling the SR; and in a case that the priority of the SR is lower than or equal to the priority of the NACK PUCCH, transmitting the NACK PUCCH and dropping or canceling the SR.

Optionally, in a case that the first uplink transmission includes an SR, the transmitting one of the NACK PUCCH and the first uplink transmission and dropping or canceling the other based on a type of the first uplink transmission includes at least one of the following:

in a case that the SR is a positive SR, transmitting the SR and dropping or canceling the NACK PUCCH; and in a case that the SR is a negative SR, transmitting the NACK PUCCH and dropping or canceling the SR.

Optionally, the transmitting one of the NACK PUCCH and the first uplink transmission and dropping or canceling the other based on at least one of network-side indication signaling and RSRP includes at least one of the following:

in a case that the RSRP is greater than or equal to a preset threshold, transmitting the first uplink transmission and dropping the NACK PUCCH; and in a case that the RSRP is less than the preset threshold, transmitting the NACK PUCCH and canceling the first uplink transmission.

Optionally, the multiplexing PUCCH with the first uplink transmission for transmission includes:

in a case that there is a conflict between the feedback resources and the transmission resources for the first uplink transmission in a target time unit, multiplexing N bits of hybrid automatic repeat request HARQ information with the first uplink transmission for transmission, where the target time unit is a time unit configured or scheduled to report at least one piece of HARQ information, and N is an integer greater than or equal to 1.

Optionally, in a case that downlink transmission corresponding to the HARQ information has been successfully decoded, the HARQ information is an acknowledgement (ACK); or in a case that downlink transmission corresponding to the HARQ information has not been successfully decoded, the HARQ information is a NACK.

Optionally, the priority of the HARQ information is the same as the priority of the first uplink transmission.

Optionally, the first uplink transmission includes at least one of the following:

channel state information CSI, physical uplink shared channel PUSCH, and SR.

The information transmission apparatus in the embodiments of this application can improve the conflict resolution performance of the terminal.

The information transmission apparatus in this embodiment of this application may be an apparatus or an apparatus or electronic device having an operating system, or may be a component, an integrated circuit, or a chip in a terminal. The apparatus or electronic device may be a mobile terminal or a non-mobile terminal. For example, the mobile terminal may include but is not limited to the type of the terminal 11 listed above. The non-mobile terminal may be a server, a network attached storage (NAS), a personal computer (PC), a television (TV), a teller machine, or a self-service computer. This is not specifically limited in this embodiment of this application.

The information transmission apparatus provided in this embodiment of this application can implement processes implemented in the method embodiments of FIG. 2, and achieve a same technical effect. To avoid repetition, details are not described herein again.

Figure 6:
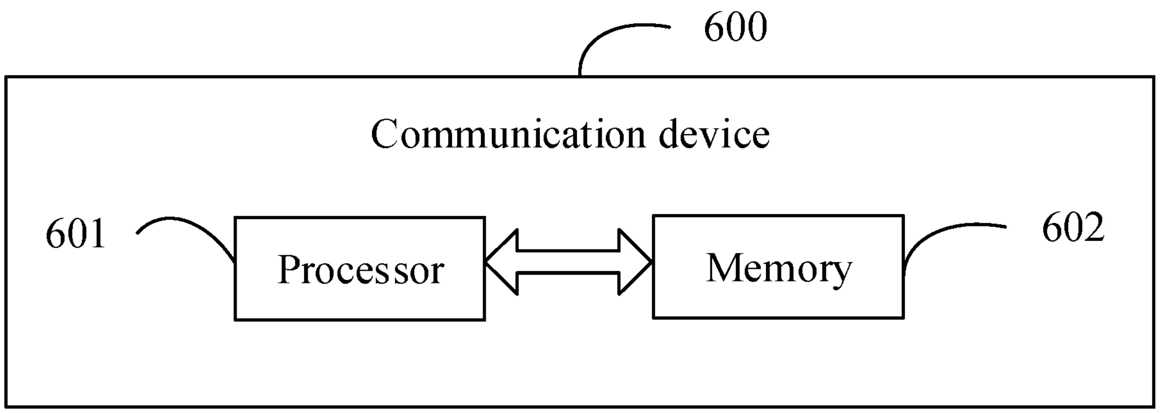
FIG. 6 is a structural diagram of a communication device according to an embodiment of this application.

Optionally, as shown in FIG. 6, an embodiment of this application further provides a communication device 600, including a processor 601, a memory 602, a program or instructions stored in the memory 602 and may be run on the processor 601. For example, when the communication device 600 is a terminal, the program or instructions are executed by the processor 601 to implement each process of the foregoing information transmission method embodiment, and a same technical effect can be achieved.

The embodiments of this application further provide a terminal, including a processor and a communication interface. The processor or the communication interface is used to perform conflict handling when there is a conflict between the feedback resources and the transmission resources for the first uplink transmission. The feedback resources refer to physical uplink control channel PUCCH resources, and the feedback mode is negative-acknowledgment NACK-only feedback mode. The conflict handling includes one of the following:

transmitting PUCCH or the first uplink transmission; and multiplexing PUCCH with the first uplink transmission for transmission.

Figure 7:
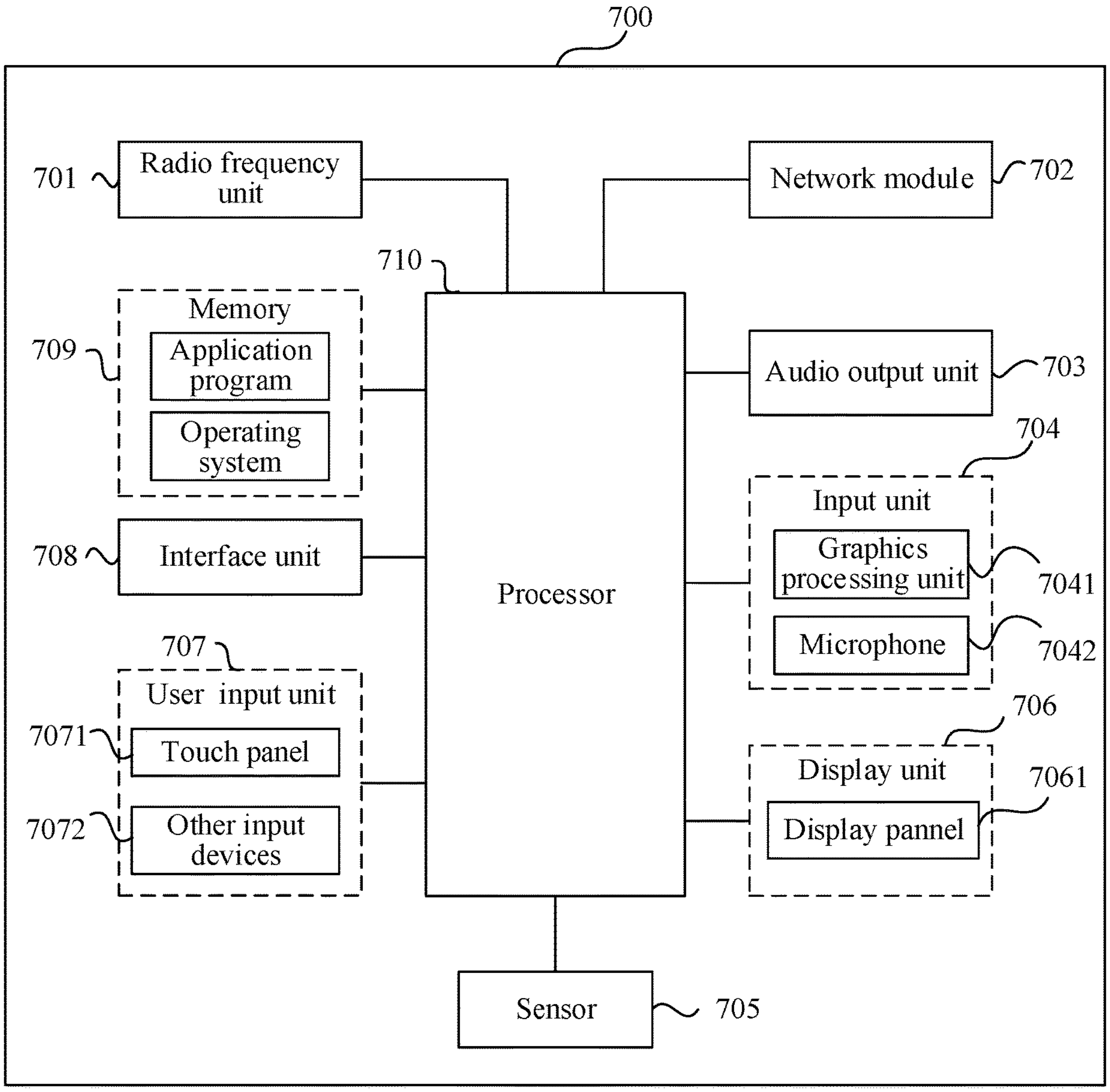
FIG. 7 is a structural diagram of a terminal according to an embodiment of this application.

It should be noted that the terminal embodiment is corresponding to the method embodiment on the terminal side. All implementation processes and implementations of the foregoing method embodiment are applicable to the terminal embodiment, with the same technical effect achieved. Specifically, FIG. 7 is a schematic diagram of a hardware structure of a terminal implementing an embodiment of this application.

The terminal 700 includes but is not limited to at least some of components such as a radio frequency unit 701, a network module 702, an audio output unit 703, an input unit 704, a sensor 705, a display unit 706, a user input unit 707, an interface unit 708, a memory 709, and a processor 710.

It can be understood by those skilled in the art that the terminal 700 may further include a power supply (for example, a battery) supplying power to the components. The power supply may be logically connected to the processor 710 via a power management system, so that functions such as charge management, discharge management, and power consumption management are implemented by using the power management system. The structure of the terminal shown in FIG. 7 does not constitute any limitation on the terminal, and the terminal may include more or fewer components than shown in the figure, or combine some of the components, or have different arrangements of the components. Details are not described herein.

It should be understood that in this embodiment of this application, the input unit 704 may include a graphics processing unit (GPU) 7041 and a microphone 7042. The graphics processing unit 7041 processes image data of a static picture or a video that is obtained by an image capture apparatus (for example, a camera) in a video capture mode or an image capture mode. The display unit 706 may include a display panel 7061. The display panel 7061 may be configured in a form of a liquid crystal display, an organic light-emitting diode display, or the like. The user input unit 707 includes a touch panel 7071 and other input devices 7072. The touch panel 7071 is also referred to as a touch-screen. The touch panel 7071 may include two parts: a touch detection apparatus and a touch controller. The other input devices 7072 may include but are not limited to a physical keyboard, a functional button (such as a volume control button or a power on/off button), a trackball, a mouse, and a joystick. Details are not described herein.

In this embodiment of this application, after receiving downlink data from a network-side device, the radio frequency unit 701 sends the downlink data to the processor 710 for processing, and in addition, sends uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 709 may include a program or instruction storage area and a data storage area. The program or instruction storage area may store an operating system, an application program or instruction required by at least one function (for example, a sound playback function or an image playback function), and the like. In addition, the memory 709 may include a high-speed random access memory, and may further include a non-volatile memory, where the non-volatile memory may be a read-only memory (ROM), a programmable read-only memory (PROM), an erasable programmable read-only memory (EPROM), an electrically erasable programmable read-only memory (EEPROM), or a flash memory. for example, at least one disk storage device, flash memory device, or other non-volatile solid-state storage device.

The processor 710 may include one or more processing units. Optionally, an application processor and a modem processor may be integrated in the processor 710. The application processor primarily processes an operating system, user interfaces, application programs or instructions, and the like. The modem processor primarily processes radio communication, for example, being a baseband processor. It can be understood that the modem processor may alternatively be not integrated in the processor 710.

The radio frequency unit 701 is configured to perform conflict handling in a case that there is a conflict between feedback resources and transmission resources for a first uplink transmission, where the feedback resources are physical uplink control channel PUCCH resources, the feedback mode is negative-acknowledgment NACK-only feedback mode, and the conflict handling includes one of the following:

transmitting PUCCH or the first uplink transmission; and multiplexing PUCCH with the first uplink transmission for transmission.

Optionally, the PUCCH can be a NACK PUCCH, and "transmitting the PUCCH or the first uplink transmission" includes one of the following:

transmitting the NACK PUCCH and dropping or canceling the first uplink transmission; and transmitting the first uplink transmission and dropping or canceling the NACK PUCCH.

Optionally, the PUCCH can be a NACK PUCCH, and "transmitting the PUCCH or the first uplink transmission" includes one of the following:

transmitting one of the NACK PUCCH and the first uplink transmission and dropping or canceling the other based on a priority of the NACK PUCCH and a priority of the first uplink transmission;

transmitting one of the NACK PUCCH and the first uplink transmission and dropping or canceling the other based on a type of the first uplink transmission; and transmitting one of the NACK PUCCH and the first uplink transmission and dropping or canceling the other based on at least one of network-side indication signaling and reference signal received power RSRP.

Optionally, the transmitting one of the NACK PUCCH and the first uplink transmission and dropping or canceling the other based on a priority of the NACK PUCCH and a priority of the first uplink transmission includes at least one of the following:

in a case that the priority of the first uplink transmission is higher than or equal to the priority of the NACK PUCCH, transmitting the first uplink transmission and dropping or canceling the NACK PUCCH; and in a case that the priority of the first uplink transmission is lower than or equal to the priority of the NACK PUCCH, transmitting the NACK PUCCH and dropping or canceling the first uplink transmission.

Optionally, in a case that the first uplink transmission includes a scheduling request SR, the transmitting one of the NACK PUCCH and the first uplink transmission and dropping or canceling the other based on a priority of the NACK PUCCH and a priority of the first uplink transmission includes at least one of the following:

in a case that the priority of the SR is higher than or equal to the priority of the NACK PUCCH and the SR is a positive SR, transmitting the SR and dropping or canceling the NACK PUCCH;

in a case that the priority of the SR is higher than or equal to the priority of the NACK PUCCH and the SR is a negative SR, transmitting the NACK PUCCH and dropping or canceling the SR; and in a case that the priority of the SR is lower than or equal to the priority of the NACK PUCCH, transmitting the NACK PUCCH and dropping or canceling the SR.

Optionally, in a case that the first uplink transmission includes an SR, the transmitting one of the NACK PUCCH and the first uplink transmission and dropping or canceling the other based on a type of the first uplink transmission includes at least one of the following:

in a case that the SR is a positive SR, transmitting the SR and dropping or canceling the NACK PUCCH; and in a case that the SR is a negative SR, transmitting the NACK PUCCH and dropping or canceling the SR.

Optionally, the transmitting one of the NACK PUCCH and the first uplink transmission and dropping or canceling the other based on at least one of network-side indication signaling and RSRP includes at least one of the following:

in a case that the RSRP is greater than or equal to a preset threshold, transmitting the first uplink transmission and dropping the NACK PUCCH; and in a case that the RSRP is less than the preset threshold, transmitting the NACK PUCCH and canceling the first uplink transmission.

Optionally, the multiplexing PUCCH with the first uplink transmission for transmission includes:

in a case that there is a conflict between the feedback resources and the transmission resources for the first uplink transmission in a target time unit, multiplexing N bits of hybrid automatic repeat request HARQ information with the first uplink transmission for transmission, where the target time unit is a time unit configured or scheduled to report at least one piece of HARQ information, and N is an integer greater than or equal to 1.

Optionally, in a case that downlink transmission corresponding to the HARQ information has been successfully decoded, the HARQ information is an acknowledgement (ACK); or in a case that downlink transmission corresponding to the HARQ information has not been successfully decoded, the HARQ information is a NACK.

Optionally, the priority of the HARQ information is the same as the priority of the first uplink transmission.

Optionally, the first uplink transmission includes at least one of the following:

channel state information (CSI), physical uplink shared channel (PUSCH), and SR.

The terminal in this embodiment of this application can improve the conflict resolution performance of the terminal.

Specifically, the terminal in this embodiment of this application further includes: instructions or a program stored in the memory 709 and capable of running on the processor 710. The processor 710 invokes the instructions or program in the memory 709 to execute the method executed by the modules shown in FIG. 5, with the same technical effects achieved. To avoid repetition, details are not described herein again.

An embodiment of this application further provides a readable storage medium, where the readable storage medium stores a program or instructions, and when the program or instructions are executed by a processor, the processes of the embodiments of the foregoing information transmission method are implemented, with the same technical effect achieved. To avoid repetition, details are not described herein again.

The processor is a processor in the terminal described in the foregoing embodiment. The readable storage medium includes a computer-readable storage medium, such as a computer read-only memory (ROM), a random access memory (RAM), a magnetic disk, or an optical disc.

Another embodiment of this application provides a chip, where the chip includes a processor and a communication interface, the communication interface is coupled to the processor, and the processor is configured to run a program or instructions to implement the processes of the foregoing embodiment of the information transmission method, with the same technical effects achieved. To avoid repetition, details are not described herein again.

An embodiment of this application further provides a computer program product, where the computer program product is stored in a non-volatile storage medium, and when the computer program product is executed by at least one processor so as to implement the steps of the foregoing embodiment of the information transmission method, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that the terms “include”, “comprise”, or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more constraints, an element preceded by “includes a . . . ” does not preclude the presence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

By means of the foregoing description of the implementations, persons skilled in the art may clearly understand that the method in the foregoing embodiment may be implemented by software with a necessary general hardware platform. Certainly, the method in the foregoing embodiment may also be implemented by hardware. However, in many cases, the former is a preferred implementation. Based on such an understanding, the technical solutions of this application essentially or the part contributing to the related art may be implemented in a form of a computer software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. An information transmission method, comprising:

multiplexing, by a terminal, physical uplink control channel (PUCCH) with a first uplink transmission for transmission in a case that there is an overlap between feedback resources and transmission resources for the first uplink transmission, wherein the feedback resources are PUCCH resources, the feedback mode of the feedback resources is negative-acknowledgment (NACK)-only feedback mode;

wherein the multiplexing PUCCH with the first uplink transmission for transmission comprises:

in a case that there is an overlap between the feedback resources and the transmission resources for the first uplink transmission in a target time unit, multiplexing N bits of hybrid automatic repeat request (HARQ) information with the first uplink transmission for transmission, wherein the target time unit is a time unit configured or scheduled to report at least one piece of HARQ information, and N is an integer greater than or equal to 1;

wherein in a case that downlink transmission corresponding to the HARQ information has been successfully decoded, the HARQ information is an acknowledgment (ACK); or in a case that downlink transmission corresponding to the HARQ information has not been successfully decoded, the HARQ information is a NACK.

2. The method according to claim 1, wherein a priority of the HARQ information is the same as a priority of the first uplink transmission.

3. The method according to claim 1, wherein the first uplink transmission comprises at least one of the following:

channel state information (CSI), physical uplink shared channel (PUSCH).

4. A chip, comprising a processor and a communication interface, wherein the communication interface is coupled to the processor, and the processor is configured to run a program or instructions so as to implement the information transmission method according to claim 1.

5. The method according to claim 1, wherein a priority of the PUCCH is the same as a priority of the first uplink transmission.

6. The method according to claim 3, wherein a priority of the HARQ information is the same as a priority of the CSI.

7. A terminal, comprising a processor, a memory, and a program or instructions stored in the memory and capable of running on the processor, wherein when the program or instructions are executed by the processor to implement following steps:

multiplexing physical uplink control channel (PUCCH) with a first uplink transmission for transmission in a case that there is an overlap between feedback resources and transmission resources for the first uplink transmission, wherein the feedback resources are PUCCH resources, the feedback mode of the feedback resources is negative-acknowledgment (NACK)-only feedback mode;

wherein the multiplexing PUCCH with the first uplink transmission for transmission comprises:

in a case that there is an overlap between the feedback resources and the transmission resources for the first uplink transmission in a target time unit, multiplexing N bits of hybrid automatic repeat request (HARQ) information with the first uplink transmission for transmission, wherein the target time unit is a time unit configured or scheduled to report at least one piece of HARQ information, and N is an integer greater than or equal to 1;

wherein in a case that downlink transmission corresponding to the HARQ information has been successfully decoded, the HARQ information is an acknowledgment (ACK); or in a case that downlink transmission corresponding to the HARQ information has not been successfully decoded, the HARQ information is a NACK.

8. The terminal according to claim 7, wherein the first uplink transmission comprises at least one of the following:

channel state information (CSI), physical uplink shared channel (PUSCH).

9. The terminal according to claim 7, wherein a priority of the HARQ information is the same as a priority of the first uplink transmission.

10. The terminal according to claim 7, wherein a priority of the PUCCH is the same as a priority of the first uplink transmission.

11. The terminal according to claim 8, wherein a priority of the HARQ information is the same as a priority of the CSI.

* * * * *